(12) United States Patent
Parsons

(10) Patent No.: US 10,796,612 B1
(45) Date of Patent: Oct. 6, 2020

(54) VANITY PLATE ASSEMBLY

(71) Applicant: Richard Parsons, Cameron, WV (US)

(72) Inventor: Richard Parsons, Cameron, WV (US)

( * ) Notice: Subject to any disclaimer, the term of this patent is extended or adjusted under 35 U.S.C. 154(b) by 0 days.

(21) Appl. No.: 16/538,697

(22) Filed: Aug. 12, 2019

(51) Int. Cl.
| | |
|---|---|
| *G09F 7/22* | (2006.01) |
| *G09F 21/04* | (2006.01) |
| *G09F 7/06* | (2006.01) |
| *B60R 13/10* | (2006.01) |
| *B60D 1/00* | (2006.01) |
| *G09F 7/18* | (2006.01) |

(52) U.S. Cl.
CPC .............. *G09F 7/22* (2013.01); *B60R 13/105* (2013.01); *G09F 7/06* (2013.01); *G09F 21/048* (2013.01); *B60D 1/00* (2013.01); *G09F 2007/1865* (2013.01); *G09F 2007/1895* (2013.01)

(58) Field of Classification Search
CPC .............................................. G09F 2007/1865
USPC ............................................................ 40/210
See application file for complete search history.

(56) References Cited

U.S. PATENT DOCUMENTS

| | | | | | |
|---|---|---|---|---|---|
| 1,086,445 | A | * | 2/1914 | Devlin .................... | F16M 11/14 248/288.51 |
| 1,857,141 | A | * | 5/1932 | Corley ................... | B60R 13/105 40/209 |
| 2,304,743 | A | * | 12/1942 | Schott ....................... | G09F 7/22 40/617 |
| 4,646,997 | A | * | 3/1987 | Fadley ...................... | G09F 7/20 248/201 |
| 5,566,965 | A | * | 10/1996 | Applegate ................ | B60D 1/06 280/500 |
| 6,238,122 | B1 | * | 5/2001 | Brooks .................... | G09F 21/04 403/24 |
| 6,247,257 | B1 | * | 6/2001 | Powell ..................... | G09F 21/04 280/507 |
| 6,253,476 | B1 | | 7/2001 | Powell | |
| 6,463,686 | B1 | | 10/2002 | Eisenbraun | |
| 6,553,697 | B1 | | 4/2003 | Pichan | |
| 6,910,705 | B1 | | 6/2005 | Harwood | |
| 7,204,507 | B1 | | 4/2007 | James | |
| 10,434,961 | B2 | * | 10/2019 | Hu ......................... | B60R 13/105 |
| 2006/0138187 | A1 | * | 6/2006 | Love ........................ | B60R 13/00 224/572 |
| 2010/0015367 | A1 | * | 1/2010 | Mitchell .................. | G09F 19/22 428/31 |
| 2010/0319229 | A1 | * | 12/2010 | McCoy ...................... | G09F 7/22 40/606.01 |
| 2014/0345175 | A1 | * | 11/2014 | Larson .................... | G09F 21/04 40/591 |
| 2017/0326931 | A1 | | 11/2017 | Batiste | |
| 2018/0342184 | A1 | * | 11/2018 | Magovern, III | ........ G09F 21/12 |

* cited by examiner

*Primary Examiner* — Kristina N Junge

(57) ABSTRACT

A vanity plate assembly includes a plate that has indicia printed thereon. A strip is positionable against the plate. A pair of brackets is provided and each of the brackets releasably engages the strip. A pair of fasteners is each extendable through the plate, the strip and the brackets for coupling the plate, the strip and the brackets together. A pair of couplers is provided and each of the couplers releasably engages a respective one of the brackets. Each of the couplers releasably engages a respective one of a pair of chain supports on a hitch receiver of a vehicle. In this way the plate is suspended beneath the hitch receiver without interfering with using the hitch receiver.

8 Claims, 6 Drawing Sheets

VANITY PLATE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vanity plate devices and more particularly pertains to a new vanity plate device for suspending a vanity plate from a hitch receiver.

(2) Description of Related Art Including Information Disclosed Under 37 CFR 1.97 and 1.98

The prior art relates to vanity plate devices.

BRIEF SUMMARY OF THE INVENTION

An embodiment of the disclosure meets the needs presented above by generally comprising a plate that has indicia printed thereon. A strip is positionable against the plate. A pair of brackets is provided and each of the brackets releasably engages the strip. A pair of fasteners is each extendable through the plate, the strip and the brackets for coupling the plate, the strip and the brackets together. A pair of couplers is provided and each of the couplers releasably engages a respective one of the brackets. Each of the couplers releasably engages a respective one of a pair of chain supports on a hitch receiver of a vehicle. In this way the plate is suspended beneath the hitch receiver without interfering with using the hitch receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
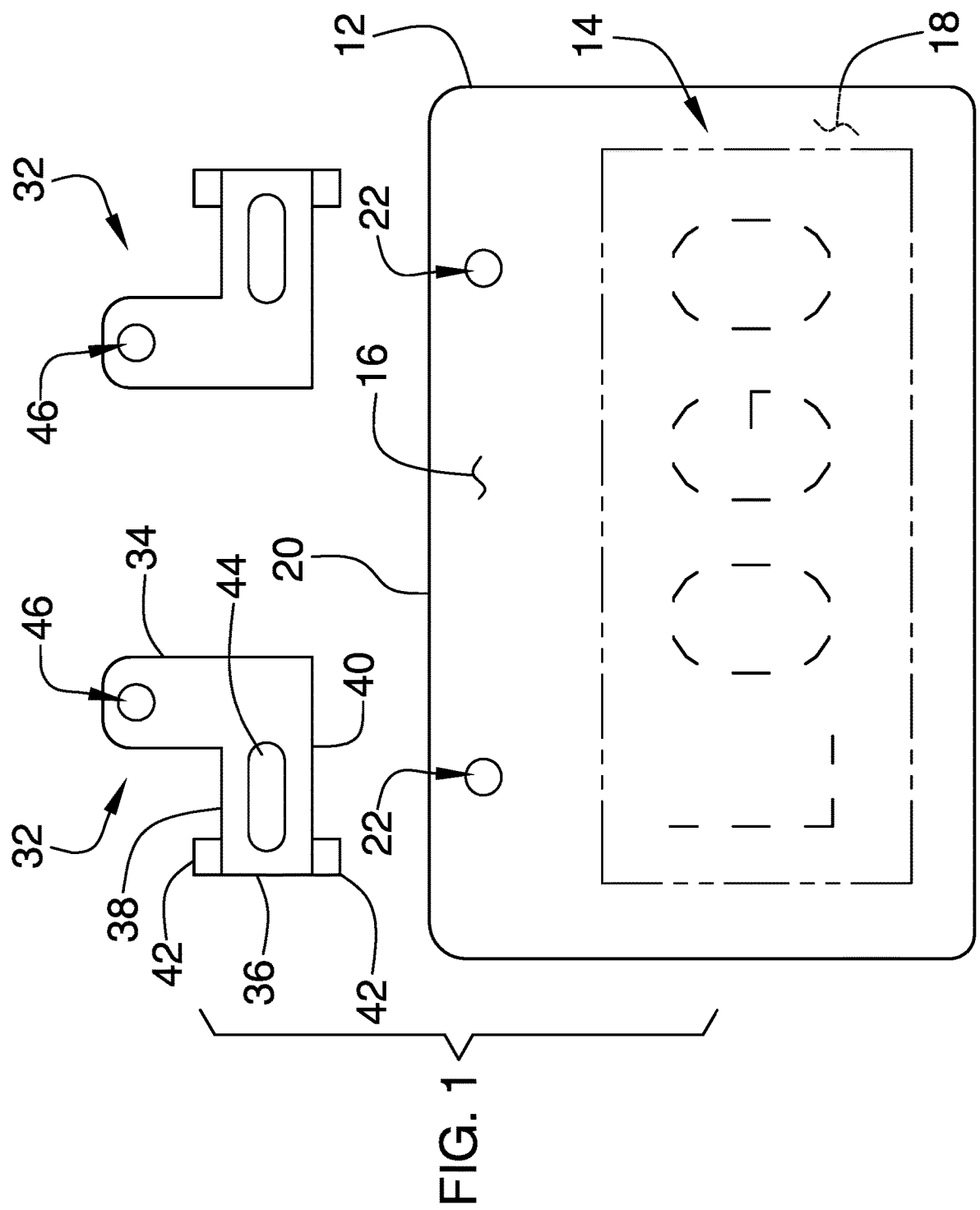
FIG. 1 is a perspective view of a pair of brackets and a plate of a vanity plate assembly according to an embodiment of the disclosure.
Figure 2:
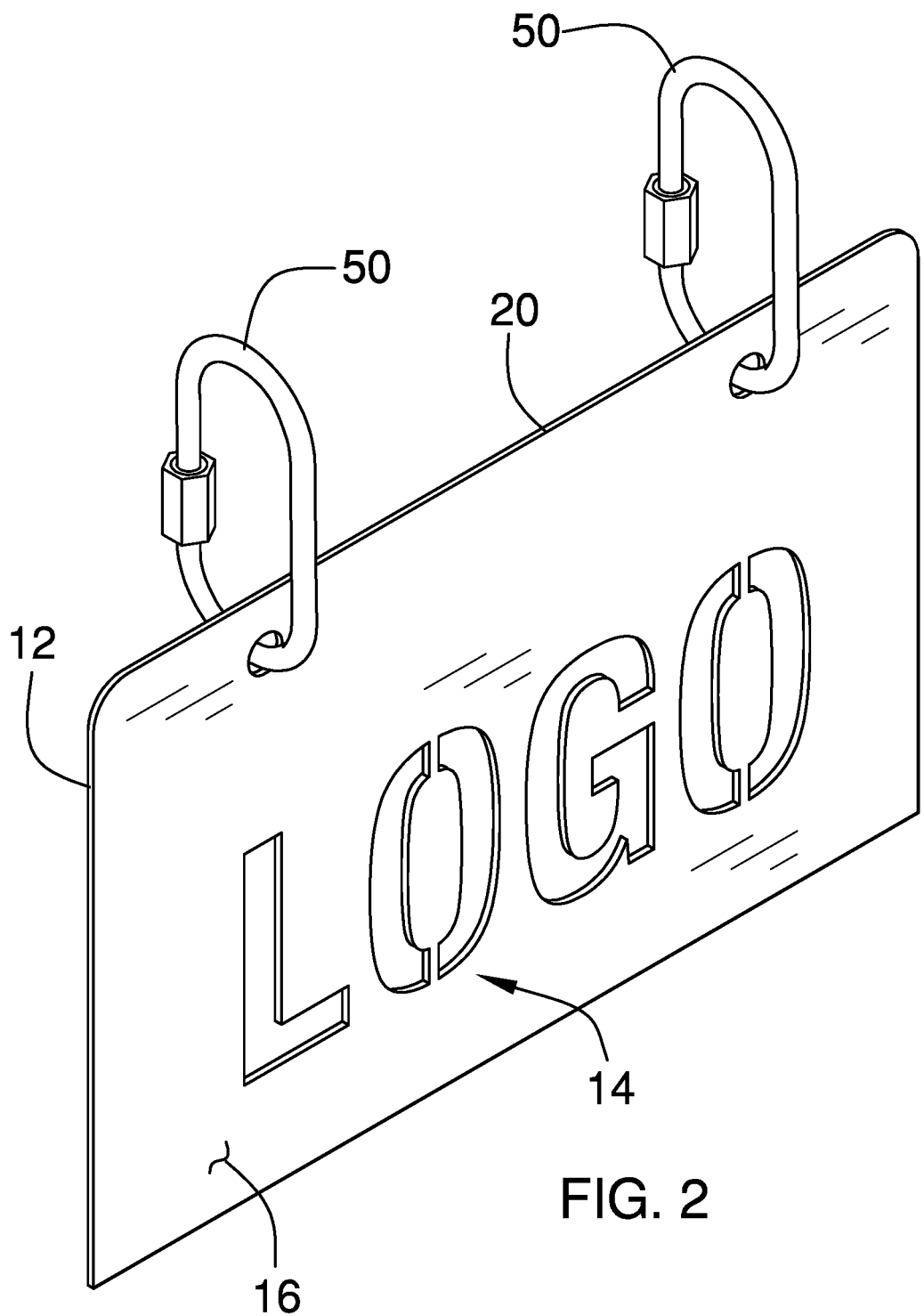
FIG. 2 is a front perspective view of a pair of couplers and a plate of an embodiment of the disclosure.
Figure 3:
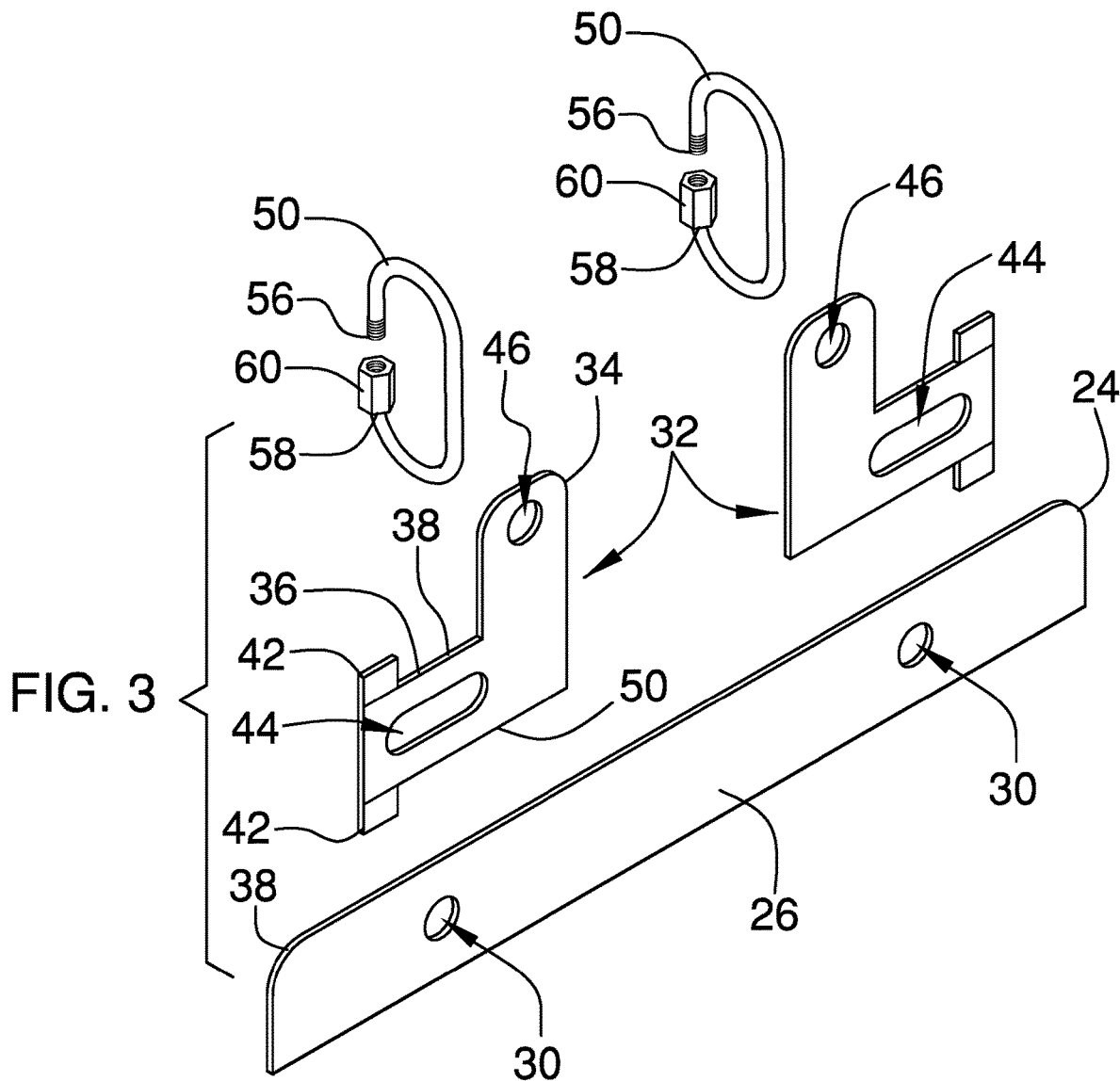
FIG. 3 is a front view of a strip, a pair of brackets and a pair of couplers of an embodiment of the disclosure.
Figure 4:
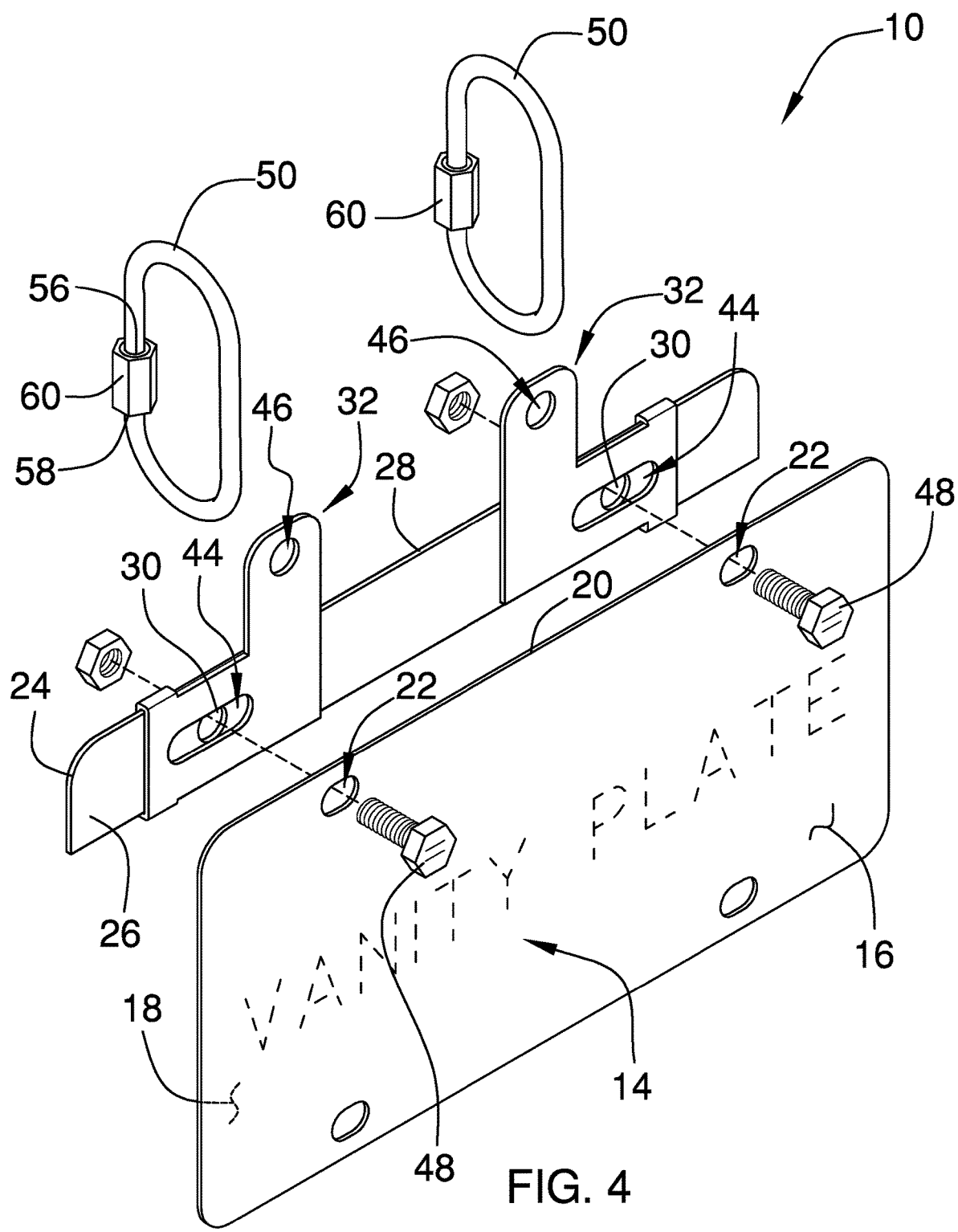
FIG. 4 is a perspective view of a vanity plate assembly according to an embodiment of the disclosure.
Figure 5:
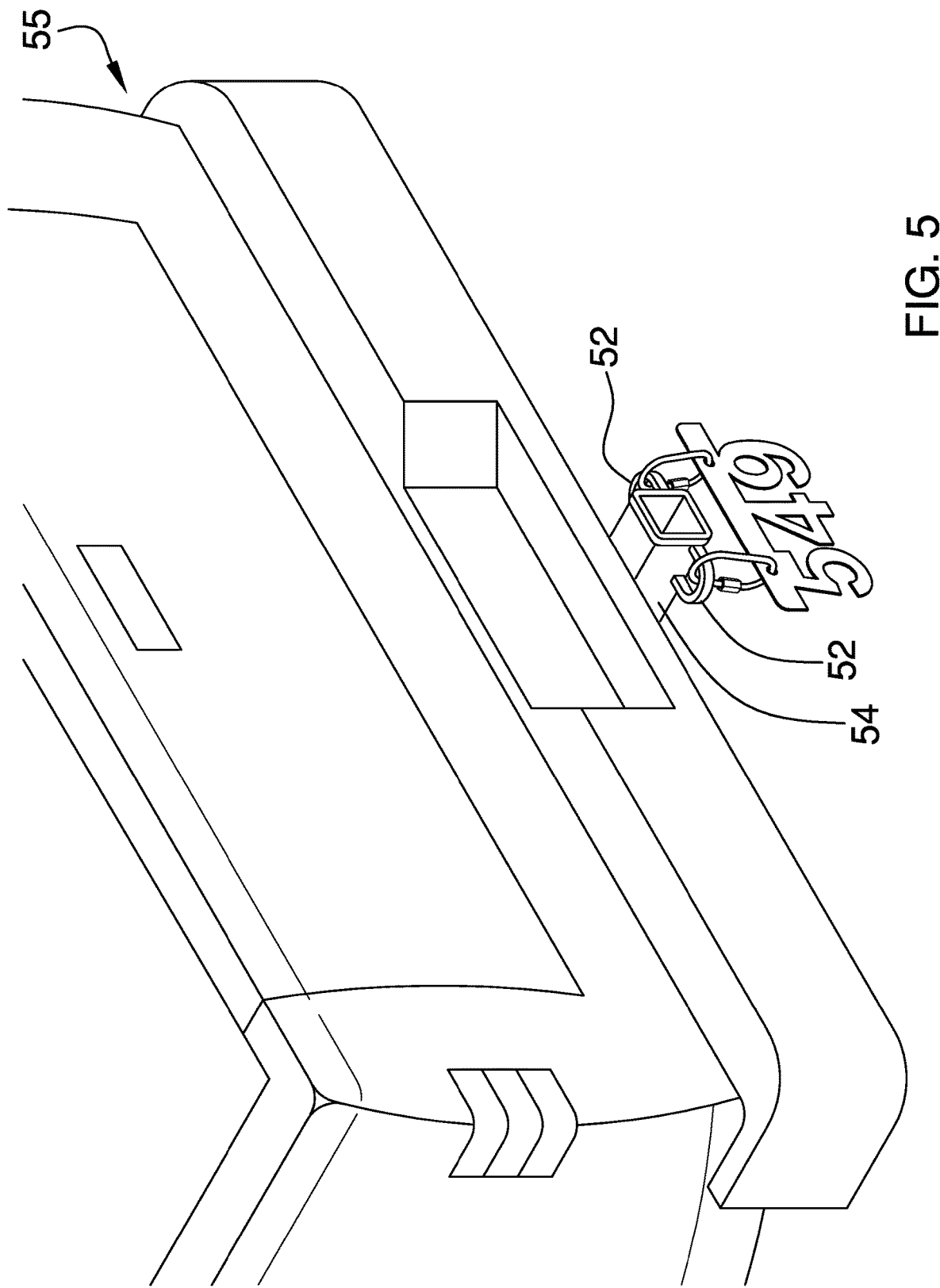
FIG. 5 is a perspective in-use view of an embodiment of the disclosure.
Figure 6:
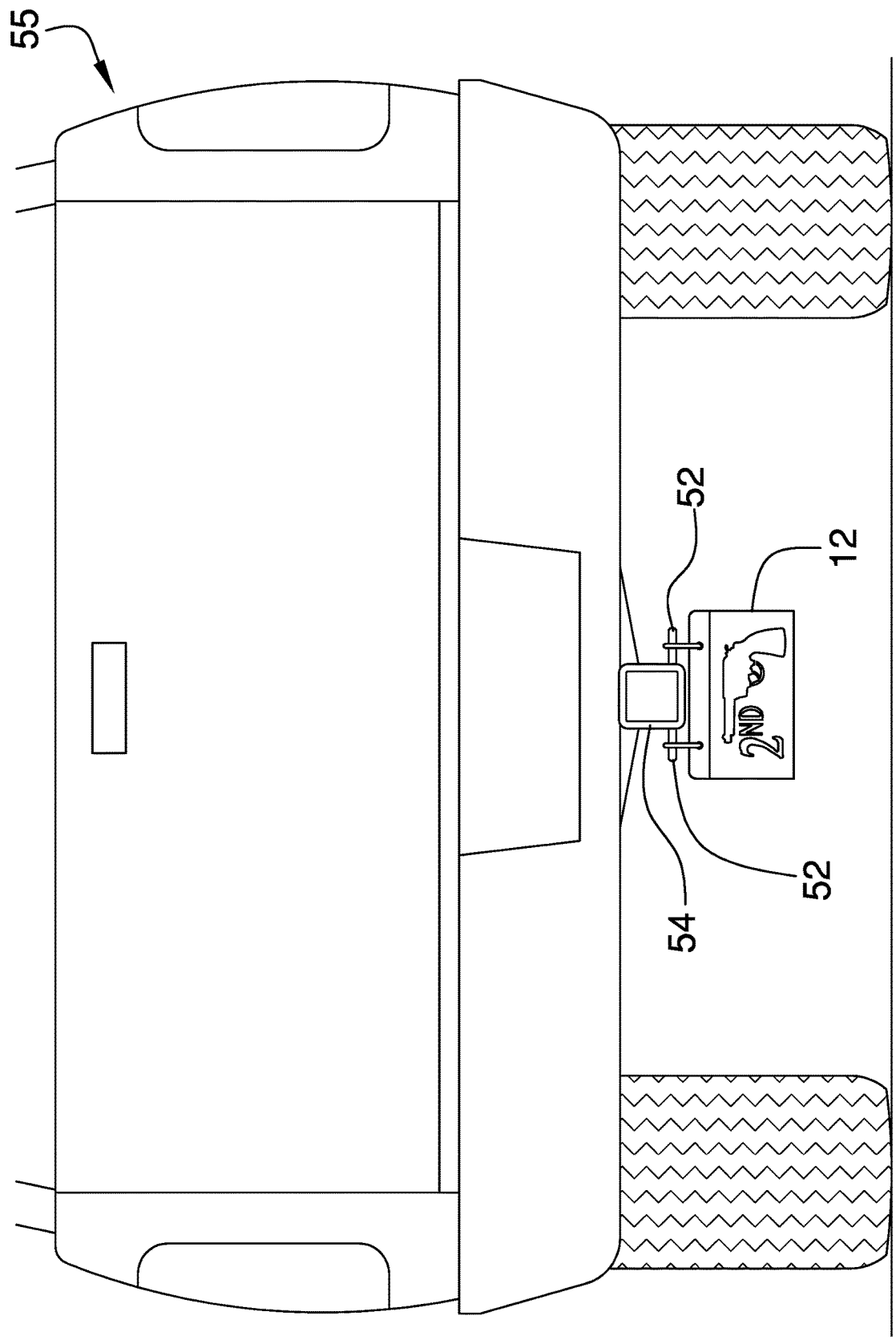
FIG. 6 is an in-use view of an embodiment of the disclosure.

With reference now to the drawings, and in particular to FIGS. 1 through 6 thereof, a new vanity plate device embodying the principles and concepts of an embodiment of the disclosure and generally designated by the reference numeral 10 will be described.

As best illustrated in FIGS. 1 through 6, the vanity plate assembly 10 generally comprises a plate 12 that has indicia 14 printed thereon. The plate 12 has a front surface 16, a back surface 18 and a top edge 20. The plate 12 has a pair of holes 22 each extending through the front surface 16 and the back surface 18. Each of the holes 22 is spaced downwardly from the top edge 20 and the holes 22 are spaced apart from each other and are distributed along the top edge 20. The indicia 14 is positioned on the front surface 16 and the indicia 14 may comprise, but not be limited to, words, an company logo, a sports team logo or any other desired indicia. The plate 12 may have dimensions similar to that of a state license plate or the like.

A strip 24 is provided and the strip 24 is positionable against the plate 12. The strip 24 has a front side 26 and a back side 28, and the strip 24 has a pair of openings 30 each extending through the front side 26 and the back side 28. The front side 26 of the strip 24 is positioned against the back surface 18 of the plate 12 and each of the openings 30 is aligned with a respective one of the holes 22 when the strip 24 is positioned against the plate 12.

A pair of brackets 32 is included and each of the brackets 32 releasably engages the strip 24. Each of the brackets 32 has a first portion 34 forming an angle with a second portion 36, and the second portion 36 of each of the brackets 32 has an upper edge 38 and a lower edge 40. The second portion 36 of each of the brackets 32 has a pair of tabs 42 thereon. Each of the tabs 42 is positioned on a respective one of the upper edge 38 and the lower edge 40 of the second portion 36. Each of the tabs 42 is comprised of a bendable material. Additionally, the second portion 36 of each of the brackets 32 has a slot 44 extending therethrough.

The second portion 36 of each of the brackets 32 is positioned against the front side 26 of the strip 24 having the slot 44 in the second portion 36 of each of the brackets 32 being aligned with a respective one of the openings 30 in the strip 24. Each of the tabs 42 on the second portion 36 of each of the brackets 32 is bendable over the strip 24 for retaining each of the brackets 32 on the strip 24. The first portion 34 of each of the brackets 32 extends upwardly from the strip 24 when the brackets 32 are retained on the strip 24. The first portion 34 of each of the brackets 32 has a hole 46 extending therethrough.

A pair of fasteners 48 is provided and each of the fasteners 48 is extendable through the plate 12, the strip 24 and the brackets 32 for coupling the plate 12, the strip 24 and the brackets 32 together. Each of the fasteners 48 extends through a respective one of the holes 22 in the plate 12, a respective one of the slots 44 in the second portion 36 of a respective one of the brackets 32 and a respective one of the openings 30 in the strip 24. Each of the fasteners 48 may comprise a nut and a bolt or other type of releasable fastener.

A pair of couplers 50 is provided and each of the couplers 50 releasably engages a respective one of the brackets 32. Each of the couplers 50 releasably engages a respective one of the pair of chain supports 52 on a hitch receiver 54 of a vehicle 55 to suspend the plate 12 beneath the hitch receiver 54. In this way the indicia 14 on the plate 12 can be displayed for ornamental purposes without interfering with using the hitch receiver 54. The vehicle 55 may be a pickup, a flatbed truck or any other vehicle that has a hitch receiver 54.

Each of the couplers 50 has a first end 56 and a second end 58. Each of the couplers 50 is curved such that each of the couplers 50 forms an open loop having the first end 56 being spaced from the second end 58. Each of the couplers 50 is extendable through the hole 46 in the first portion 34 of a respective one of the brackets 32. Each the couplers 50 includes a closure 60. The closure 60 extends between the first end 56 and the second end 58 when the closure 60 is positioned in a closed position to inhibit the couplers 50 from being removed from the hitch receiver 54. The closure 60 is displaced from the second end 58 when the closure 60 is positioned in an open position to facilitating the couplers 50 to be removed from the hitch receiver 54. As is most clearly shown in FIG. 5, the plate 12 may be structured to define letters or numbers.

In use, each of the brackets 32 is attached to the strip 24 and each of the fasteners 48 is extended through the plate 12, the strip 24 and the brackets 32. Each of the couplers 50 is extended through the first portion 34 of the respective bracket. Additionally, each of the couplers 50 is coupled to the respective chain support 52 on the hitch receiver 54. In this way the plate 12 is suspended from the hitch receiver 54 without interfering with using the hitch receiver 54. As is most clearly shown in FIG. 2, each of the couplers 50 can be extended through respective ones of the holes 22 in the plate 12 for suspending the plate 12 from the hitch receiver 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vanity plate assembly comprising:
   a hitch receiver on a vehicle;
   a plate having indicia being printed thereon;
   a strip being positionable against said plate;
   a pair of brackets, each of said brackets releasably engaging said strip, each of said brackets having a first portion forming a perpendicular angle with a second portion, said second portion of each of said brackets having a slot therein, said first portion of each said bracket having a hole therein, said hole in said first portion being horizontally offset from said slot in said second portion wherein said brackets are positionable such that said holes in said first portions are positioned over and between said slots in said second portions;
   a pair of fasteners, each of said fasteners being extendable through said plate, said strip and a respective one of said slots in said brackets for coupling said plate, said strip and said brackets together; and
   a pair of couplers, each of said couplers releasably engaging a respective one of said brackets, each of said couplers releasably engaging a respective one of a pair of chain supports on said hitch receiver of said vehicle thereby suspending said plate beneath the hitch receiver each of said couplers having a first end and a second end, each of said couplers being curved such that each of said couplers forms an open loop having said first end being spaced from said second end, each of said couplers being extendable through said hole in said first portion of a respective one of said brackets.

2. The assembly according to claim 1, wherein said plate has a front surface, a back surface and a top edge, said plate having a pair of holes each extending through said front surface and said back surface, each of said holes in said plate being spaced downwardly from said top edge, said holes in said plate being spaced apart from each other and being distributed along said top edge, said indicia being positioned on said front surface.

3. The assembly according to claim 2, wherein said strip has a front side and a back side, said strip having a pair of openings each extending through said front side and said back side, said front side of said strip being positioned against said back surface of said plate, each of said openings being aligned with a respective one of said holes in said plate when said strip is positioned against said plate.

4. The assembly according to claim 3, further comprising said second portion of each of said brackets having an upper edge and a lower edge, said second portion of each of said brackets having a pair of tabs thereon, each of said tabs being positioned on a respective one of said upper edge and said lower edge of said second portion.

5. The assembly according to claim 4, further comprising said second portion of each of said brackets being positioned against said front side of said strip having said slot in said second portion of each of said brackets being aligned with a respective one of said openings in said strip, each of said tabs on said second portion of each of said brackets being bendable over said strip for retaining each of said brackets on said strip, said first portion of each of said brackets extending upwardly from said strip when said brackets are retained on said strip.

6. The assembly according to claim 5, wherein each of said fasteners extends through a respective one of said holes in said plate, each of said fasteners extending through a respective one of said slots in said second portion of a respective one of said brackets, each of said fasteners extending through a respective one of said openings in said strip.

7. The assembly according to claim 1, wherein each said couplers includes a closure, said closure extending between said first end and said second end when said closure is positioned in a closed position thereby inhibiting said couplers from being removed from the hitch receiver, said closure being displaced from said second end when said closure is positioned in an open position thereby facilitating said couplers to be removed from the hitch receiver.

8. The assembly according to claim 1, wherein:
   said plate has a front surface, a back surface and a top edge, said plate having a pair of holes each extending through said front surface and said back surface, each of said holes being spaced downwardly from said top edge, said holes being spaced apart from each other and being distributed along said top edge, said indicia being positioned on said front surface;
   said strip has a front side and a back side, said strip having a pair of openings each extending through said front side and said back side, said front side of said strip being positioned against said back surface of said plate, each of said openings being aligned with a respective one of said holes when said strip is positioned against said plate;
   said second portion of each of said brackets having an upper edge and a lower edge, said second portion of each of said brackets having a pair of tabs thereon, each of said tabs being positioned on a respective one of said upper edge and said lower edge of said second portion, said second portion of each of said brackets being positioned against said front side of said strip having said slot in said second portion of each of said brackets being aligned with a respective one of said openings in said strip, each of said tabs on said second portion of each of said brackets being bendable over said strip for retaining each of said brackets on said strip, said first portion of each of said brackets extending upwardly from said strip when said brackets are retained on said strip;
   each of said fasteners extends through a respective one of said holes in said plate, each of said fasteners extending through a respective one of said slots in said second portion of a respective one of said brackets, each of said fasteners extending through a respective one of said openings in said strip; and
   each of said couplers has a first end and a second end, each of said couplers being curved such that each of said couplers forms an open loop having said first end being spaced from said second end, each of said couplers being extendable through said hole in said first portion of a respective one of said brackets, each said couplers including a closure, said closure extending between said first end and said second end when said closure is positioned in a closed position thereby inhibiting said couplers from being removed from the hitch receiver, said closure being displaced from said second end when said closure is positioned in an open position thereby facilitating said couplers to be removed from the hitch receiver.

* * * * *